W. M. CARR & C. H. SPEER.
MELTING FURNACE AND PROCESS OF USING THE SAME.
APPLICATION FILED NOV. 2, 1908.
936,758.
Patented Oct. 12, 1909.
3 SHEETS—SHEET 1.
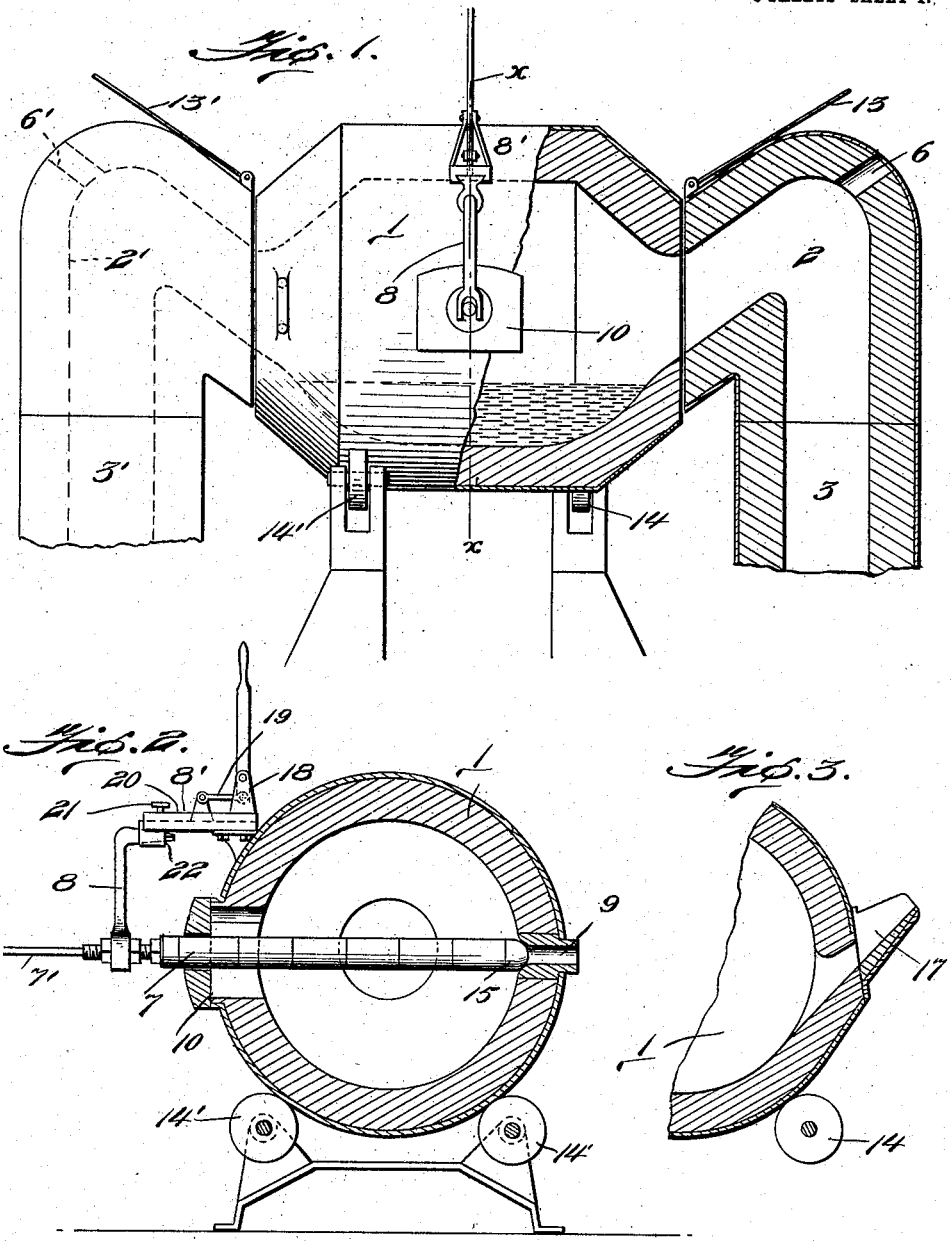

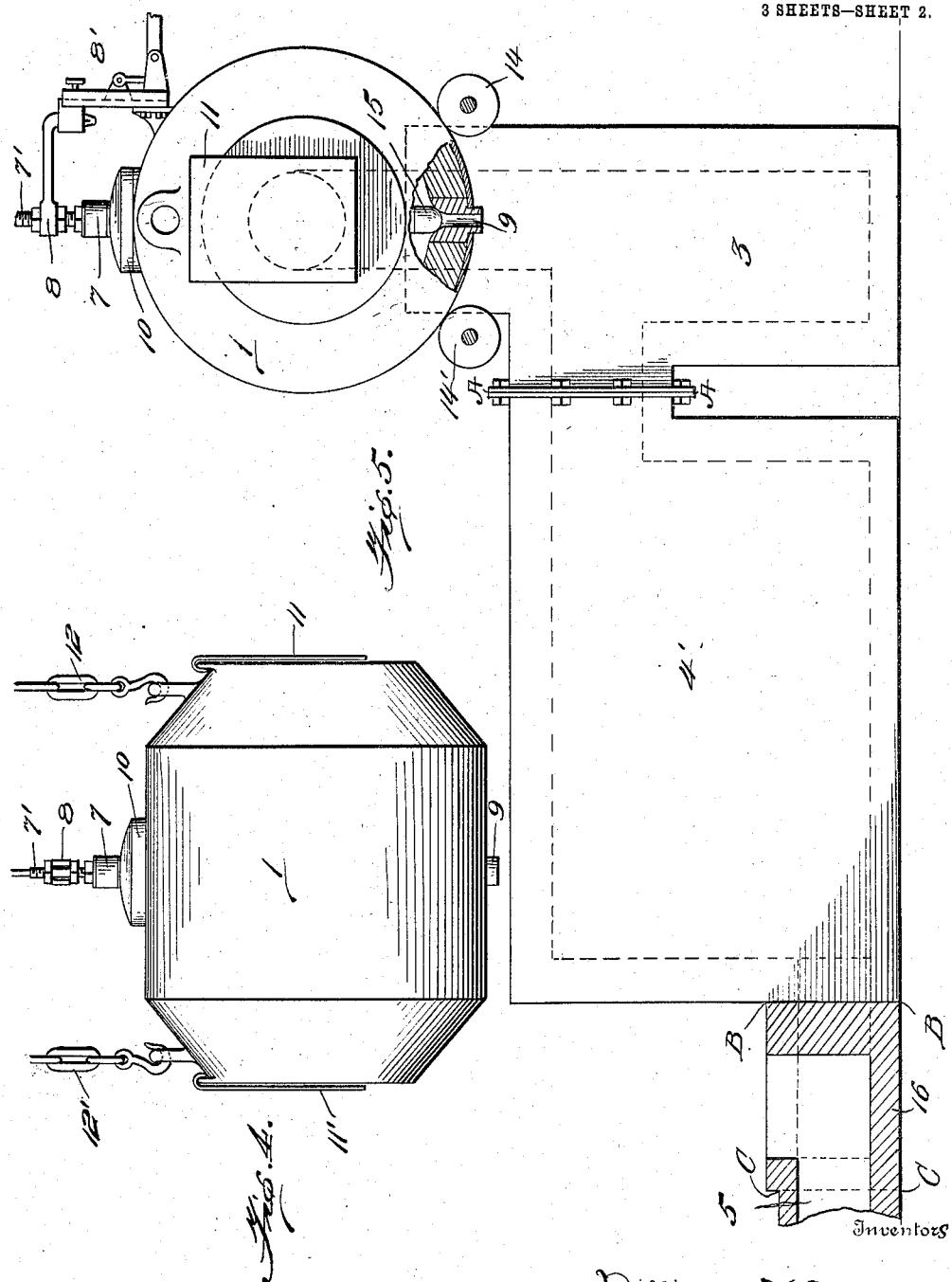

W. M. CARR & C. H. SPEER.
MELTING FURNACE AND PROCESS OF USING THE SAME.
APPLICATION FILED NOV. 2, 1908.
936,758.
Patented Oct. 12, 1909.
3 SHEETS—SHEET 3.
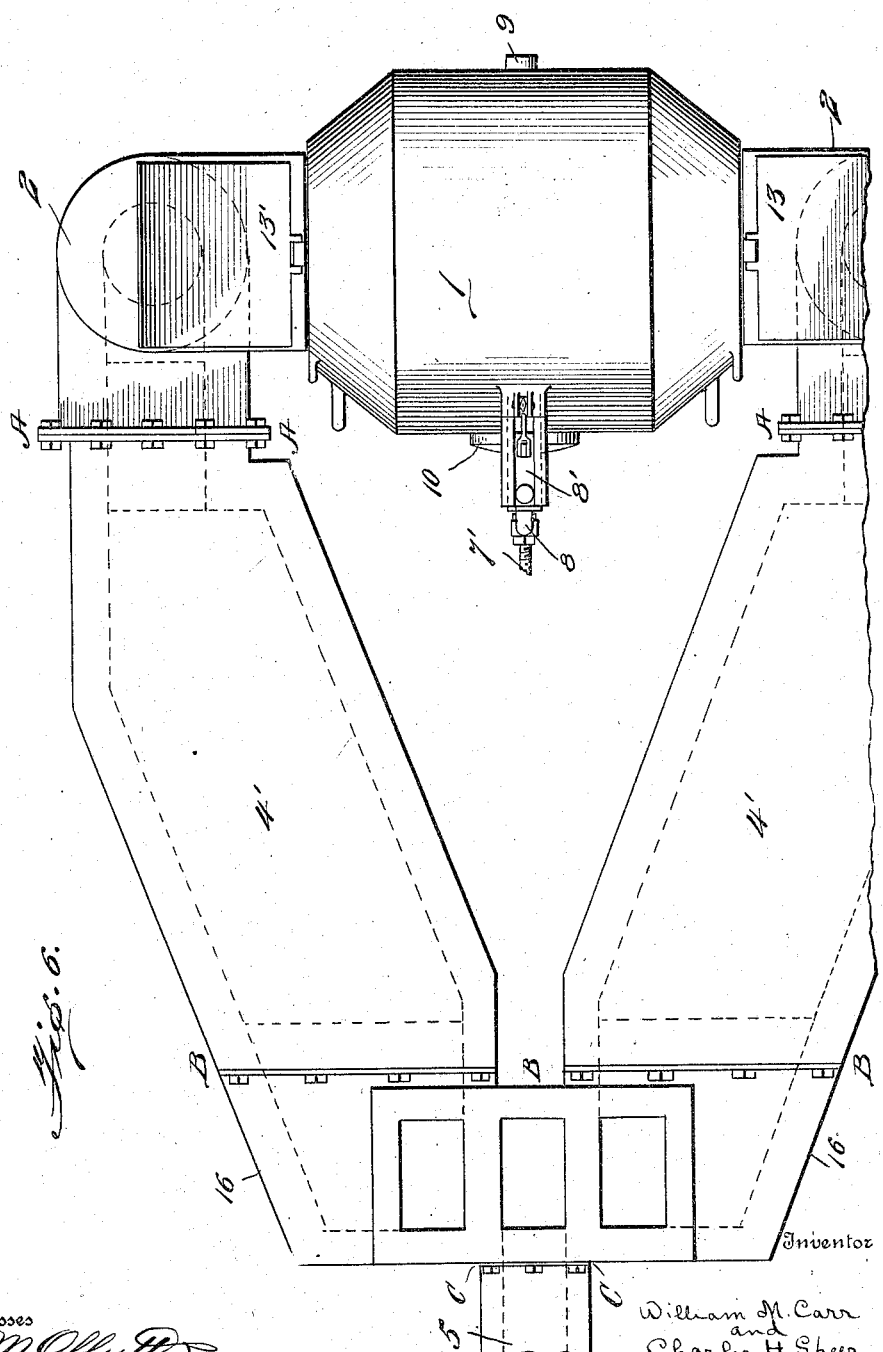

UNITED STATES PATENT OFFICE.

WILLIAM M. CARR, OF NEW YORK, N. Y., AND CHARLES H. SPEER, OF CHESTER, PENNSYLVANIA.

MELTING-FURNACE AND PROCESS OF USING THE SAME.

936,758.  Specification of Letters Patent.  Patented Oct. 12, 1909.

Application filed November 2, 1908. Serial No. 460,752.

*To all whom it may concern:*

Be it known that we, WILLIAM M. CARR and CHARLES H. SPEER, citizens of the United States, residing at New York, in the county of New York and State of New York, and at Chester, in the county of Delaware and State of Pennsylvania, respectively, have invented certain new and useful Improvements in Melting-Furnaces and Processes of Using Same, of which the following is a specification.

This invention relates to melting furnaces and processes of using same; and it embraces a furnace chamber having walls of refractory material with roof and hearth approaching within effective radiating distance of each other, said chamber having preferably a shape circular or nearly circular in section to increase radiative effect, and direct connected regenerative firing means for such chamber adapted to produce therein a uniformly mixed body of superheated flame, said chamber and said means being so relatively shaped proportioned and arranged as to allow the production of a substantially unstratified flame mass within said chamber, said flame mass being within radiative reach of said refractory walls at all points and in a state of uniform combustion therein, and said chamber being further preferably made detachable, movable and portable; and it also comprises a method of melting metals and like substances which embraces producing within substantial contact with the same a superheated flame burning with substantial uniformity in all planes from combustible burning with the aid of regeneratively heated air, all points in said flame being within effective radiative reach of superheated refractory material; all as more fully hereinafter set forth and as claimed.

In the ordinary methods of melting high-melting metals, such as steel, and melting other high-melting materials, such as glass, it is common in the art to melt them in a reversing furnace, that is, a furnace provided at either end with regenerative means and having the flame produced alternately at the two ends, waste gases being alternately withdrawn through the regenerative means at the other end. This device has a number of very important advantages, one being that the flame temperature within the furnace chamber may be raised to almost any degree short of the dissociating point of carbon dioxid, the heat employed in heating up the nitrogen of air being restored to the flame. The chambers in these furnaces are invariably of large dimensions, it being the current opinion in the art that smaller dimensions are impracticable. In a "50-ton furnace," for example, the hearth chamber is some 16 feet by 33, while in a "5-ton furnace", which is ordinarily considered to be the smallest practicable size, the dimensions are some 6 by 12 feet. Such chambers are considered necessary for the full development of the regenerative flame. This is, however, an error, due to a misapprehension of conditions and experiments upon furnace chambers but a little smaller than those of the 5-ton furnaces. Aside from any catalytic, flame-promoting influence of the refractory material of the chamber walls, and this is very important in this type of furnace, the rapidity of combustion is in large measure dependent on the radiation from such walls, and combustion velocity and degree of temperature attained are interdependent. Radiation however diminishes as the square of the distance, and, for this purpose in combustion-acceleration, becomes unimportant at a distance of a couple of feet. Practically therefore in these large furnace chambers, the quick hot combustion takes place mainly in the layers next the roof, and a relatively long distance of travel of the flame is required under these conditions to complete the combustion within the furnace chamber of the underlying layers. In a thick stream of flame, such as occurs in these relatively large furnace chambers, since the hot flame layer and superheated products of combustion hug the roof, there is a positive resistance to vertical movements in the flame mass which would bring the underlying layers within the effective (for this purpose) radiating distance of the roof or within contact with the refractory materials. The result is that underlying layers are stratified and non-uniform and though they are usually burning, considered as a whole, the burning is relatively slow and requires a long path of travel for complete combustion. This is the main reason for the ordinary long furnace chamber; which must be long enough for the irregular combustion under these conditions to complete itself. In the long chamber top and bottom layers will ultimately mix to a large extent, but, neglecting this mixture for the moment, it may be said that in the ordinary type of furnace the top layers of flame must be given too long a path of travel in order to accommodate the lower layers. In the uppermost layers, combustion is practically complete long before combustion is intense in the lower. In the effort to counteract these results, it is customary to use a relatively large excess of air over that theoretically necessary for the combustible, an excess much accelerating combustion. This however results in increased stratification. The gross result in one of these large furnaces is the production of a sheet of quick-burning, intensely hot flame next the roof, while in lower layers of the flaming mass, or those filling the barrel of the furnace, combustion is somewhat delayed. This is one of the reasons for the belief that relatively large furnaces giving a comparatively long length of flame travel are necessary since, under the conditions, if the furnace chamber were short not enough time would be given the flame current considered as a whole, to produce sufficient combustion within the chamber and part or most of the combustion would take place beyond the furnace chamber within the small, hot-walled passages offered by the spaces in the regenerator checker-works. In other words, it is believed that the large furnace chamber is necessary to afford length of travel and the time factor for combustion. This belief however is not correct. By rearranging the conditions in the furnace chamber so that the flame mass, or gas mass, is at no point further than a foot or so from a heated surface, or, in other words, is within effective radiative reach of such surface, new conditions are afforded so that not only can comparatively small furnace chambers be heated efficiently, but in such chambers the flame can be of a different type, producing a higher average temperature within such chamber and a much greater efficiency per unit of combustible employed. In such a chamber great length is not necessary and is disadvantageous, since it is not necessary to retain the gas mass in the furnace chamber after combustion ceases. It is usually considered that in furnaces of this type, economy increases with the size, there being a less area of exposed and air-cooled wall per cubic foot of chamber in a large than in a small furnace. But where in a large regenerative furnace it is considered good practice to melt a ton of steel with 35 to 40 gallons of a fuel oil, in the stated rearranged small and short furnace chamber a ton can be melted with 20 gallons. The possible temperatures in the small furnace are also higher. About 1600° C. is usually considered the maximum in the ordinary furnaces while with the new furnaces over 1700° can be easily attained with a less quantity of the same fuel in spite of the increased ratio of outer, heat-dissipating surface per cubic foot of contained flame-chamber afforded in such a small furnace. This difference is probably due to the quickened combustion and less excess of air in the peculiar flame within the chamber. Other reasons for these novel results probably are that in the smaller furnace with every portion of the hearth chamber within effective radiative reach of roof, walls or hearth (the hearth here acting as flame-promoting wall) and with a smaller flame body permitting vortical movements to bring the flaming gases into effective contact with the superheated refractory material (within, or in contact with, the roughened surface of which intense combustion takes place), the flame becomes much more homogeneous and manageable, burning substantially uniformly throughout and with a velocity greatly in excess of that prevailing in any stratum save the uppermost of the ordinary regenerated flame, and the combustion taking place in, or practically in, contact with the materials being heated in lieu of being more or less spaced away therefrom.

This velocity under these conditions is so great that length of chamber is not advantageous and the chamber need be not much greater in length than cross-section, and it is not ordinarily advantageous to make it more than a small fraction greater in length than diameter. And with this accelerated combustion, it is not necessary or advantageous to use the customary large excess of air, so that the flame is not diluted or stratified thereby.

In producing these results, the form of the furnace chamber may be as desired so long as the flame body is not at any point brought out of effective radiating distance of the refractory walls; but a chamber of circular or approximately circular shape (the roof at least being curved and free from pockets which would lead to pocketing of gases and to spacing away of the radiating surface from the flame surface) is preferable as this form gives a right-line radiation toward the hearth or the axis, which axis may be the level of the hearth or of metal thereon. Very conveniently, the whole chamber may be of circular or rectangular section (the former being preferable) and tubular with a central dishing at the bottom or hearth side; and at the tapping or discharge side it may be dished to form a reservoir for the metal of greater depth than the bottom to change the position of the metal during tapping and pouring, shortening the surface and increasing the depth. The side dishing will facilitate pouring as the metal will discharge faster.

Apart from the novel heating results obtained or made possible with this type of furnace, a number of distinct advantages are obtainable The device being at once a combined melting chamber and, because of its small size, practically a ladle, can be used for small castings and similar purposes in a way hardly practicable with present devices. In making small castings of, say, 5 pounds or smaller, it is hardly feasible to turn them out by ordinary open-hearth methods since small quantities of steel will not retain heat enough to permit transfer or transportation and they are therefore generally produced either from crucible melts or side-blown converters; both of which are costly and inconvenient, the converter, further, being rather uncertain in its operation. In employing the usual open-hearths for castings, the metal must be transferred ordinarily to ladles, and it is difficult to keep a ladle of steel from a 5-ton furnace (the smallest size in use) hot long enough to pour numerous molds. It is hardly practicable to bottom-pour as small an amount as, say, a ton of steel, nor can that quantity well be lip-poured. And in using a number of ladles, there is a wasteful chilling.

The present furnace chamber being small and manageable may readily be used both as a furnace and as a ladle, it being practicable to adapt such a chamber both to handling as a ladle and to transportation as such, making it movable with regard to the firing means and detachable from the same. In pouring, stopper means may be placed in position during the heating and prior to discharging, and become heated, thereby avoiding the chilling incident to the use of similar means with the ordinary ladle. As the furnace chamber maintains its initial heat during manipulation and as there need be no transference of molten metal, the ordinary ladle-chilling is also avoided.

In making the furnace chamber movable and transportable *per se*, adapting it for use as a transportable ladle, a plurality of chambers may be employed with the same regenerative devices, so that when a charge of metal is melted in one chamber and the chamber taken to a point of use, another chamber may be at once substituted and heating resumed. In making steel castings, it is frequently not convenient or permissible to have the molds near the melting furnaces, and it is desirable to have the chamber transportable to the point of use for the molten metal.

In using the described chamber as a ladle, it is obvious that the ordinary difficulties such as freezing and skulling, caused by the use of relatively cold ladles or by the use of relatively cold stopper fittings in bottom-pour ladles, are obviated. The furnace chamber, as stated, retains its initial heat. And in lip-pouring, supernatant slag upon the steel does not become entangled by, or entrained with, the stream of poured steel.

Another advantage of this device, is that the whole apparatus, including the heating means, may be conveniently made sectional and transportable, the furnace chamber forming one section, the checkers other sections, and connecting and accessory elements forming still other sections. Each such section may be made of steel containers; fitted and lined if desired, at the factory before shipment to a point of use; or lined at such point of use. The several sections may be readily assembled and dis-assembled.

In the accompanying illustration are shown, more or less diagrammatically, certain embodiments of the described apparatus, such apparatus being susceptible of use in the described method of combustion.

In this showing, Figure 1 shows a central vertical section of a furnace chamber and end attachments, the downtake flues leading to regenerator checks being broken away; Fig. 2 is a central transverse section taken through the chamber on line $x$—$x$, Fig. 1, showing the chamber in melting position; Fig. 3 is a detail fragmentary view showing the chamber with an attached pouring lip; Fig. 4 is a view of the furnace chamber detached and ready for use as a transportable ladle; Fig. 5 is an end view of the furnace chamber (part being broken away) in tapping position; and Fig. 6 shows a plan view of the complete apparatus in detachable sections.

In this showing (see Fig. 1), 1 represents a tilting or revoluble chamber body having a barrel-like shape, and, as shown, of dimensions similar to what might be rated as a 750 pound furnace, having a diameter of a couple of feet or less and a slightly greater length. In the melting position the roof should be free of pockets and be of such shape and proportions as to permit direct radiation from all points in said roof into the flaming current. It is open at either end and communicates directly with passages 2 and 2', opening into downtake flues 3 and 3'. These downtakes communicate with checkers 4 and 4' (see Fig. 6), which in turn communicate with flue 5 leading to a stack (not shown). In this apparatus, as shown, firing is by oil jets entering through ports 6 and 6' and the checkers are single, being used for air-heating alone. The structure can of course be modified for gas firing by adding duplicate checkers in a well understood way, but the structure shown is simple and possesses a number of important advantages, firing with oil or powdered fuel being better adapted for present purposes than gas firing. As shown, these ports are set at an angle which permits the oil jets to pierce through the column of heated air from the checker and produce a well-mixed flame body, opposing the tendency of the flame to rise and hug the roof with production of a stratified gas mass.

Using but a slight excess of air over that theoretically necessary and using regeneratively heated air of almost the same temperature as the flame, it is not difficult to produce the desired well-blended flame mass free of stratifications.

This furnace chamber as shown being adapted to be used as a ladle as well, is provided with a stopper rod 7' protected by refractory material, such as fire-clay, applied as sleeve 7, and operated by gooseneck 8, keyed into guide mechanism 8' (see Fig. 2) and closing nozzle 9 by means of stopper 15. Element 8, as shown, is provided with a tapered end directly engaging a corresponding sleeve 22 provided with set screw 21 and traveling in guide way 20 in element 8'. Lever mechanism 19 pivoted at 18 is adapted to cause this sleeve to travel back and forth. On the opposite side of the chamber is a charging door 10 through which the stopper rod operates. This mechanism though particularly adapted to the present type of furnace, may be used on others. Elements 11 and 11' are temporary closures, intended to prevent loss of heat, to be swung into position over the ends when the furnace chamber is removed from the regenerative structure, as by crane chains 12 and 12'. Elements 13 and 13' are similar closures for the open ports of the regenerators after removal of the furnace chamber. Elements 14 and 14' are rollers on which the furnace chamber may be tilted or revolved. Element 15 is a stopper.

Where the whole apparatus is to be made in detachable, portable sections, the down take flues may be separated from the checkers at the flange line A—A; the checkers separated from the chamber 16 for reversing valves (not shown), at flange line B—B, and this chamber in turn separated from the stack flue along line C—C. With a small furnace handling 500 pounds to a ton of steel at a melt each of these sections may be made of comparatively easily transportable dimensions when detachable along the lines indicated.

In Fig. 3, the furnace chamber is shown provided with a pouring lip 17.

The furnace chamber may be acid or basic lined, or provided with any of the ordinary linings of refractory materials. It, as well as other elements, may be made of metallic casings, lined either at the factory or at the point of use, as may be most convenient. In using the furnace chamber shown, it is revolved to bring the outlet in the position shown in Fig. 2 and charged through the opposite charging door. After fusion or treatment of the charge, the chamber may be tilted or revolved to bring the outlet in the tapping position shown in Fig. 5 and the contents discharged into molds or other containers. Or it may be picked up by a crane and taken to a point where fluid metal is desired, the lifting with the crane rolling the furnace chamber over to pouring position. During such transportation, closures 11 and 11' are desirable to retain heat. When one furnace chamber is removed to act as a ladle, or for other purposes, another and duplicate chamber can be quickly placed in position, and the operation resumed with but a momentary loss of time. During the absence of a furnace chamber, it is desirable to use closures 13 and 13' to prevent loss of heat.

In operating a furnace chamber of the dimensions stated, a well mixed body of fuel and admixed air coming from the regenerator temporarily in heat-discharging phase enters the chamber at one end as a tolerably homogeneous body of flame. No space is allowed in the chamber for stratification. The air, which will be intensely superheated by the regenerator, should not be in amount much more than is sufficient to produce combustion with the fuel, and the fuel supply is preferably arranged, as with the ports shown, to produce intimate mixture at once; whereby stratification of the flame is prevented. With any marked excess of air, such as it is necessary to use in the usual types of flame, it is difficult to avoid stratification. In such a flame body combustible and oxidant will be in contact throughout, and will burn together completely in passing slowly through the furnace chamber, with every portion of the body within effective radiating distance of the superheated walls and (there being no distinct overlying flaming layer) with every portion of the flame mass afforded opportunity to pass near to, or in contact with, such walls. In the preferred embodiment of this invention, no portion of the flame mass will be more than a foot or so away from a radiating roof, wall or sole. Under these conditions, combustion is extraordinarily quickened and with the high air temperatures afforded by the regenerators, combustion is practically complete in a path of travel of 3 or 4 feet; affording within the chamber not only higher temperatures than ordinary but a maximum utilization of heat. The flame is practically in contact with the material being treated in lieu of being spaced away therefrom as in furnaces having a roof removed a greater distance above the hearth.

In the present mode of operation, finely divided fuel is intimately disseminated throughout a body of intensely heated air, this air being, after the regenerators heat up, not much below the flame temperature so that there is little tendency for the flaming combustible to rise up as a distinct stratum while the absence of any marked excess of air further tends to diminish the tendency to stratification. The oil or other fuel being at once gasified by the intense temperature of the air into which it is projected, there is formed a mixture which is, in a way, like the combustible mixture in a gas engine, ready for a quick combustion throughout its mass with substantially uniform burning rate at all points. Passing this mass within the effective radiative reach of hot refractory walls at all points within it, rapid and uniform combustion at once sets in.

What is claimed is:—

1. A furnace comprising a short and narrow furnace chamber having refractory walls within effective radiative reach of all points within such chamber and means for supplying continuously a well-mixed mixture of fuel and regeneratively heated air to such chamber, whereby a substantially unstratified and homogeneous quickly-burning flame is produced therein.

2. A ladle furnace comprising a transportable short and narrow furnace chamber having refractory walls within effective radiative reach of all points within such chamber and having a pair of flame ports, stationary regeneratively supplied flame producing means adapted for direct engagement and disengagement with each such port, means for rocking the chamber and means for transporting the chamber.

3. A ladle furnace comprising a transportable short and narrow tubular ladle chamber having a central dishing and having flame ports at each end, such chamber having refractory walls within effective radiative reach of all points within such chamber, stationary regeneratively supplied flame producing means adapted for direct engagement and disengagement with each such port, and means for transporting the chamber.

4. In a ladle furnace, a transportable ladle chamber having ports adapted to engage with stationary regenerative firing means and closures adapted to engage said ports when said chamber is not in position.

5. In a ladle furnace, a transportable tubular furnace ladle having open ends adapted to engage with stationary regenerative firing means and closures adapted to close said ends when said chamber is not in such engagement.

6. In a ladle furnace, a pair of stationary regenerative firing devices adapted to engage ports in a removable ladle chamber and closures adapted to close the engaging elements thereof upon removal of such ladle chamber.

7. In a furnace, a furnace chamber provided with opposite charging and discharging apertures, a stopper rod extending through the charging aperture and carrying a stopper adapted to close the discharging aperture and means mounted on said chamber for operating said rod.

8. In a tilting furnace, a furnace chamber provided with opposite charging and discharging apertures, a stopper rod extending through the charging aperture and carrying a stopper adapted to close the discharging aperture and lever-controlled means mounted on the casing adapted to reciprocate said rod and stopper into and out of engagement with said discharging aperture.

9. In a ladle furnace, a rockable tubular ladle chamber provided with opposite charging and discharging apertures, firing means for producing flame within said chamber, a stopper rod extending through the charging aperture and carrying a stopper adapted to engage the discharging aperture and means mounted on the chamber adapted to reciprocate said rod and stopper into and out of engagement with said discharging aperture.

10. In a ladle furnace, a rockable tubular ladle chamber provided with opposite charging and discharging apertures, firing means for producing flame within said chamber, a stopper rod extending through the charging aperture and carrying a stopper adapted to engage the discharging aperture and means for reciprocating said rod and stopper into and out of engagement with said discharging aperture.

11. In a regenerative short and narrow furnace, a furnace chamber having refractory walls within effective radiative reach of all points within such chamber and provided with a pair of ports, regenerative air heating means directly engaging each such port and means for directing a piercing jet of fine fuel downward through regenerated air entering such a port.

12. In a regenerative furnace, a short and narrow tubular furnace chamber having refractory walls within effective radiative reach of all points within such chamber and having opposite open ends, regenerative air-heating means directly engaging such ends and means for directing a piercing jet of fine fuel downward through regenerated air entering such an open end.

13. In a regenerative ladle furnace, a transportable tubular furnace chamber having refractory walls within effective radiative reach of all points within such chamber and having opposite open ends, regenerative air-heating means engaging such open ends, means for directing a piercing jet of fine fuel through regenerated air entering such an open end, means for rocking said chamber, means for transporting said chamber, a jacketed stopper rod passing through said chamber and carrying a stopper adapted to engage a discharging aperture on one side of said chamber, and means for reciprocating said rod and stopper into and out of engagement with the discharging aperture.

14. In a transportable regenerative furnace, a short and narrow furnace chamber section having ports adapted for engagement with downtake flues and having refractory walls within effective radiative reach of all points within such chamber, a pair of down-take flues each having an end adapted for engagement with such a port and a flanged end adapted for attachment to a flanged checkerwork casing, a pair of flanged checkerwork casings, each having a pair of flanged ports, adapted respectively for engagement with such a downtake flue and with a reversing valve casing, and a reversing valve casing having flanged ports adapted for engagement with said checkerwork casings and with a chimney flue.

15. The process of heating a reverberatory furnace which comprises producing a comparatively narrow, homogeneous and unstratified flowing current of an intimately commingled mixture of finely divided fuel with intensely heated air in substantially the proportion required for complete combustion of such fuel, said current being in a state of combustion throughout its mass, and passing said current through a heated refractory-walled region having heated refractory material within effective radiative reach of every point in said current to produce a high-speed combustion therein.

16. The process of melting high-melting metals which comprises supporting such a metal within a reverberatory-roofed chamber within close proximity to the roof, producing a comparatively narrow, homogeneous and unstratified flowing current of an intimately commingled mixture of finely divided fuel with intensely heated air in substantially the proportion required to complete the combustion of the fuel, said current being in a state of combustion throughout its mass, and causing said current to positively fill all the space between said metal and said roof whereby every portion of said current will be exposed to effective combustion-accelerating radiation either from roof or high-melting metal and a high-speed combustion effected therein.

In testimony whereof, we affix our signatures in the presence of witnesses.

WILLIAM M. CARR.
CHARLES H. SPEER.

Witnesses:
 CHARLES G. NEAL,
 GEO. D. IRONS.